United States Patent
Schmidt

(10) Patent No.: US 10,823,824 B2
(45) Date of Patent: Nov. 3, 2020

(54) SENSOR ASSEMBLY

(71) Applicant: Ford Global Technologies, LLC, Dearborn, MI (US)

(72) Inventor: David J. Schmidt, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 445 days.

(21) Appl. No.: 15/818,656

(22) Filed: Nov. 20, 2017

(65) Prior Publication Data

US 2019/0154800 A1 May 23, 2019

(51) Int. Cl.
| | | |
|---|---|---|
| *G01S 7/481* | (2006.01) | |
| *G01S 17/08* | (2006.01) | |
| *G01S 17/42* | (2006.01) | |
| *G01S 17/10* | (2020.01) | |
| *B60H 1/00* | (2006.01) | |

(52) U.S. Cl.
CPC ............ *G01S 7/481* (2013.01); *G01S 7/4813* (2013.01); *G01S 7/4817* (2013.01); *G01S 17/08* (2013.01); *G01S 17/10* (2013.01); *G01S 17/42* (2013.01); *B60H 1/00271* (2013.01); *B60H 2001/003* (2013.01)

(58) Field of Classification Search
CPC . G03B 17/08; G01F 1/66; G01S 17/88; G01S 17/02; G02B 7/00
See application file for complete search history.

(56) References Cited

U.S. PATENT DOCUMENTS

| | | | |
|---|---|---|---|
| 5,567,052 A | * | 10/1996 | Yoshiike ............... G01J 5/04 374/124 |
| 7,751,188 B1 | | 7/2010 | French et al. |
| 8,385,065 B2 | | 2/2013 | Weaver et al. |
| 8,967,307 B2 | | 3/2015 | Kim |
| 9,485,451 B2 | | 11/2016 | Kawamura |
| 9,621,769 B2 | | 4/2017 | Mai et al. |
| 9,746,666 B2 | | 8/2017 | Eineren et al. |
| 2007/0263684 A1 | | 11/2007 | Nolan |
| 2010/0070090 A1 | | 3/2010 | Mirpourian et al. |
| 2010/0124058 A1 | * | 5/2010 | Miller .................... F21S 8/038 362/249.02 |

(Continued)

FOREIGN PATENT DOCUMENTS

| | | |
|---|---|---|
| CN | 204077513 U | 1/2015 |
| CN | 106494333 A | 3/2017 |

(Continued)

OTHER PUBLICATIONS

Non-Final Office Action dated Mar. 17, 2020 re U.S. Appl. No. 15/818,651, filed Nov. 20, 2017.

(Continued)

*Primary Examiner* — Luke D Ratcliffe
(74) *Attorney, Agent, or Firm* — Frank A. MacKenzie; Bejin Bieneman PLC

(57) ABSTRACT

A sensor assembly includes a sensor window, a heatsink including a plurality of fins, and a duct. The heatsink is fixed relative to the sensor window. The duct is positioned to direct airflow between the fins and across the sensor window. The sensor assembly may include a motor and/or a circuit board fixed relative to the sensor window. The heatsink may be directly connected by a thermal conductor to the motor and/or the circuit board.

18 Claims, 4 Drawing Sheets

(56) References Cited

U.S. PATENT DOCUMENTS

| | | | | |
|---|---|---|---|---|
| 2011/0205703 A1* | 8/2011 | Weaver | ............... | G03B 15/006 |
| | | | | 361/695 |
| 2015/0260843 A1* | 9/2015 | Lewis | .................. | G02B 26/108 |
| | | | | 356/5.01 |
| 2015/0362363 A1* | 12/2015 | Haynes | ................. | G01J 1/0403 |
| | | | | 250/352 |
| 2016/0041452 A1* | 2/2016 | Nomura | .................. | G01F 1/661 |
| | | | | 356/5.01 |
| 2018/0164439 A1* | 6/2018 | Droz | .................... | G01S 17/931 |

FOREIGN PATENT DOCUMENTS

| | | |
|---|---|---|
| GB | 698407 A | 10/1953 |
| KR | 101642495 B1 | 7/2016 |

OTHER PUBLICATIONS

Zhu et al. article titled "Vortex Tube Heat Booster to Improve Performance of Heat Driven Cooling Cycles for Automotive Applications," SAE International Technical Paper #: 2016-01-0245, Published: Apr. 5, 2016.

\* cited by examiner

SENSOR ASSEMBLY

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

Figure 1:
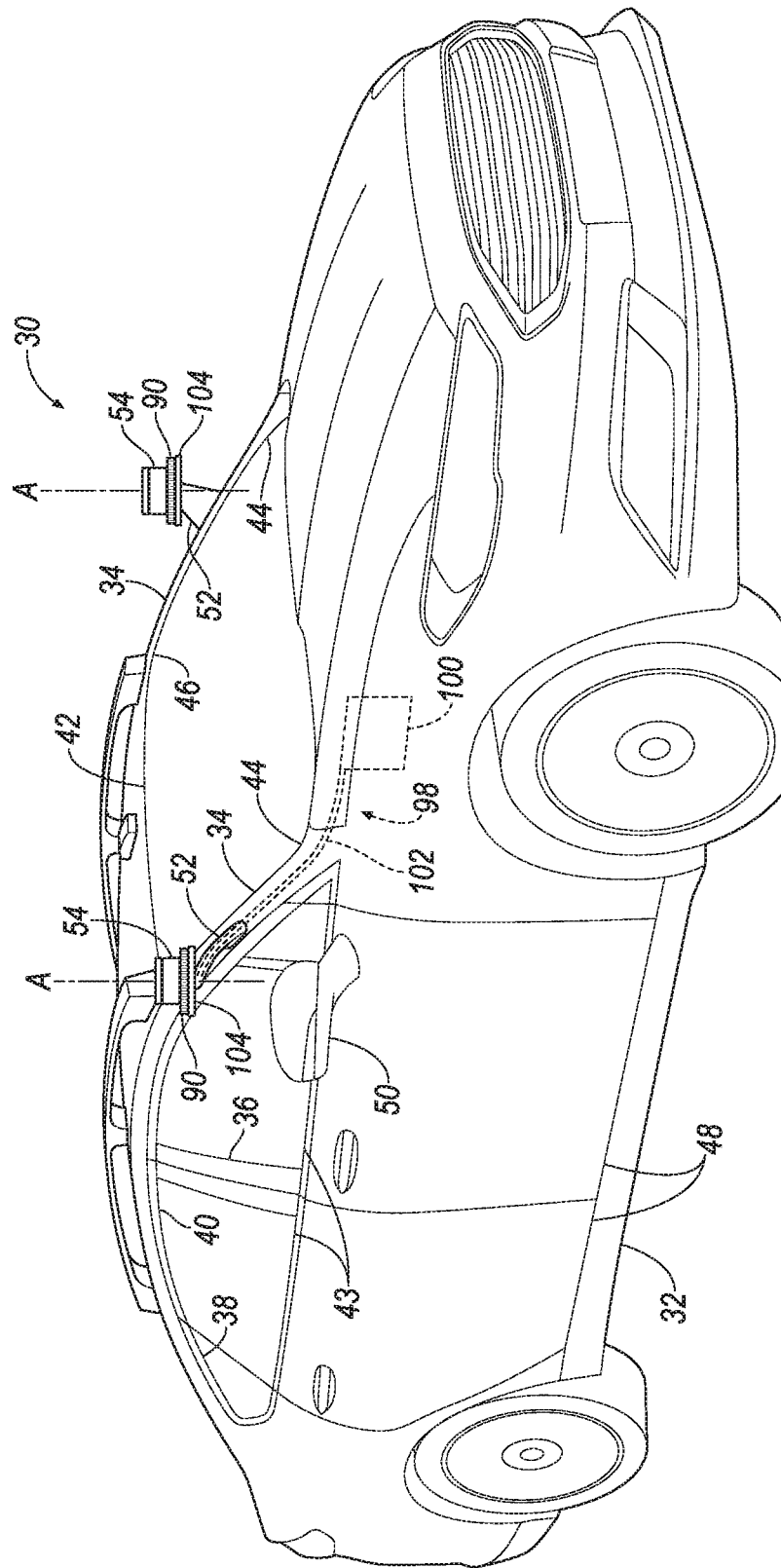
FIG. 1 is a perspective view of a vehicle including sensor assemblies.

A sensor assembly includes a sensor window, a heatsink including a plurality of fins, and a duct. The heatsink fixed relative to the sensor window. The duct is positioned to direct airflow between the fins and across the sensor window.

The sensor assembly may include a circuit board fixed relative to the sensor window, and the heatsink may be directly connected by a thermal conductor to the circuit board.

The sensor assembly may include a motor fixed relative to the sensor window, and the heatsink may be directly connected by a thermal conductor to the motor. The sensor assembly may include a sensor rotatably coupled to the motor. The sensor may be a LIDAR sensor.

The heatsink may be disposed below the sensor window.

The fins may be oriented vertically.

The duct may include a plurality of nozzles. Each adjacent pair of fins may define a gap therebetween, and each nozzle may be positioned to direct airflow through one of the gaps.

The sensor window may have a cylindrical shape. The sensor window may define an axis, and the fins may be elongated radially relative to the axis. The sensor window may define an axis, and the heatsink may be arranged annularly about the axis.

The sensor assembly may include a compressor fixed relative to the sensor window, and the duct may be positioned to receive airflow from the compressor.

The duct may be positioned to create an air curtain across the sensor window.

The duct may include a slot extending below multiple of the fins.

The fins may be exposed to an ambient environment.

The sensor window may be connectable to a vehicle, and multiple of the fins may be positioned to receive airflow therebetween from forward motion of the vehicle.

The heatsink may have a higher thermal conductivity than the sensor window.

A sensor assembly 54 includes a sensor window 84, a heatsink 90 including a plurality of fins 94, and a duct 104. The heatsink 90 is fixed relative to the sensor window 84. The duct 104 is positioned to direct airflow between the fins 94 and across the sensor window 84.

The heatsink 90 helps dissipate heat generated inside the sensor assembly 54. The duct 104 is positioned to generate airflow so that the heatsink 90 may be able to dissipate a greater quantity of heat than without the airflow, and the duct 104 is positioned to generate the same airflow across the sensor window 84 of the sensor assembly 54, creating an air curtain that may reduce debris hitting the sensor window 84. The sensor assembly 54 is efficient by using the same airflow for heat dissipation and for cleaning. The duct 104 may thus allow a sensor 68 to more accurately detect the external environment.

With reference to FIG. 1, a body 32 of the vehicle 30 may include A pillars 34, B pillars 36, C pillars 38, and roof rails 40. The A pillars 34 may extend between a windshield 42 and windows 43 and from a first end 44 at a bottom of the windshield 42 to a second end 46 at a top of the windshield 42. (The adjectives "first" and "second" are used throughout this document as identifiers and are not intended to signify importance or order.) The B pillars 36 may extend between the windows 43 of adjacent doors 48. The C pillars 38 may extend between the windows 43 and a backlite (not shown). The body 32 may also include D pillars (not shown) if the vehicle 30 is, e.g., an SUV, crossover, minivan, or station wagon, in which case the C pillars 38 extend between the windows 43 of rear doors 48 and rear left and right windows 43, and the D pillars extend between the rear right and left windows 43 and the backlite. The roof rails 40 extend along the windows 43 from the A pillar 34 to the B pillar to the C pillar.

The windshield 42, windows 43, and backlite may be formed of any suitably durable transparent material, including glass such as laminated, tempered glass or plastic such as Plexiglas or polycarbonate. The windshield 42 is located adjacent the A pillars 34.

The vehicle 30 may include side-view mirrors 50. The side-view mirrors 50 may be located on the front doors 48 or on the body 32 near the bottom of the windshield 42. The side-view mirrors 50 may be visible to a human driver through the windows 43 and provide a reflected view of a vehicle-rearward direction to the driver.

With continued reference to FIG. 1, a sensor arm 52 extends from one of the pillars 34, 36, 38 of the vehicle 30, e.g., the A pillar 34, to the sensor assembly 54. The sensor arm 52 may be located between the ends 44, 46 of the A pillar 34, that is, spaced from the bottom of the windshield 42 and from the top of the windshield 42, that is, spaced from the first end 44 and from the second end 46. The sensor arm 52 may be attached to a base 56 of the sensor assembly 54. The sensor arm 52 may have a tubular or other hollow shape, that is, a cavity may extend through the sensor arm 52. The cavity may allow wiring, tubes, etc. to pass through the sensor arm 52 while being shielded from the outside environment.

Figure 2:
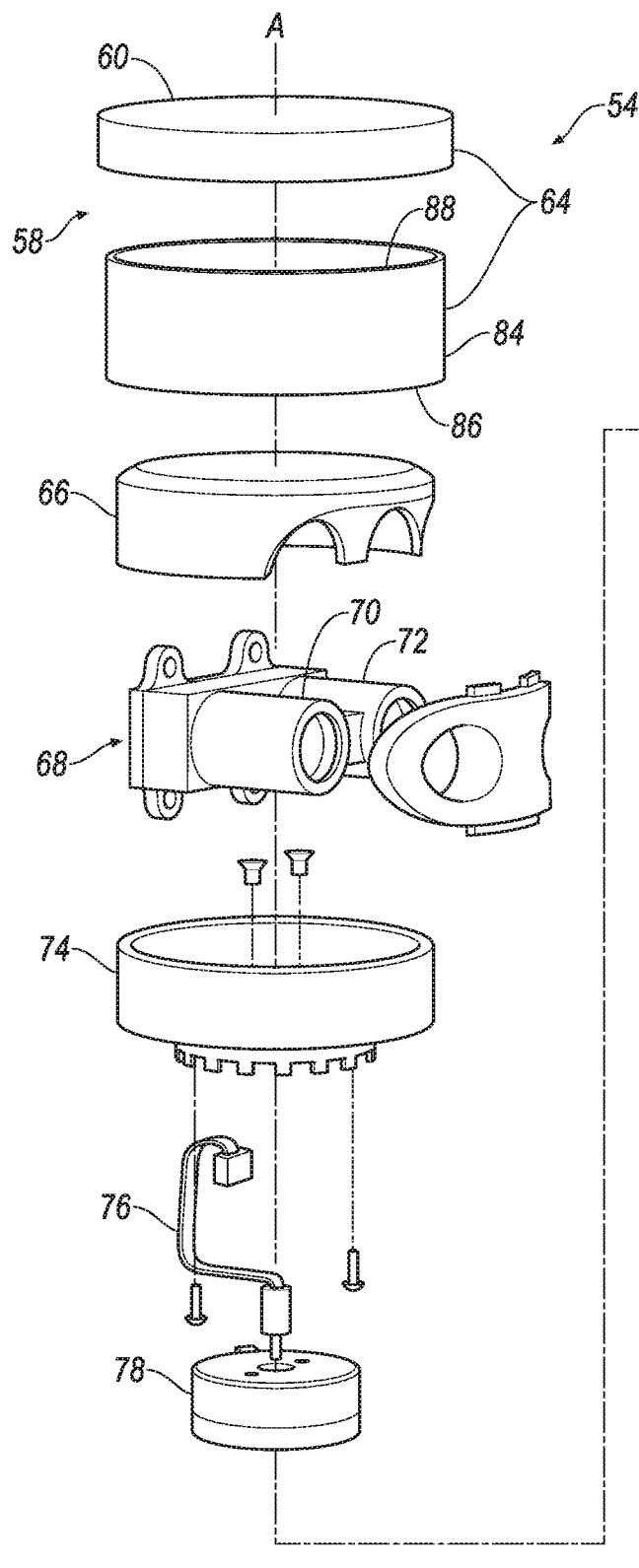
FIG. 2 is a perspective exploded view of one of the sensor assemblies.
Figure 2:
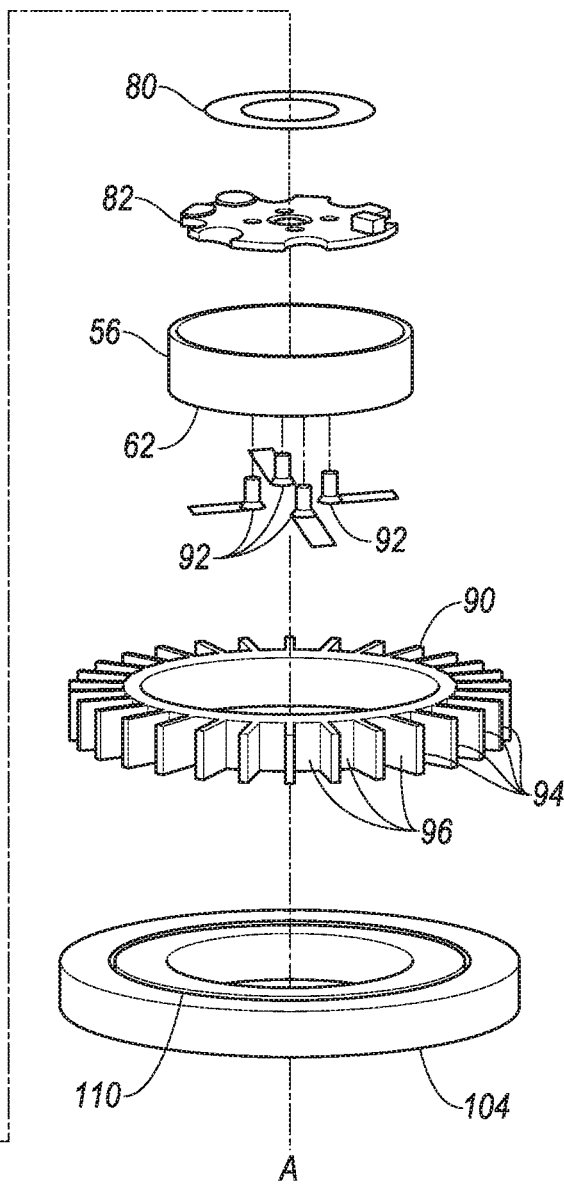
Figure 3:
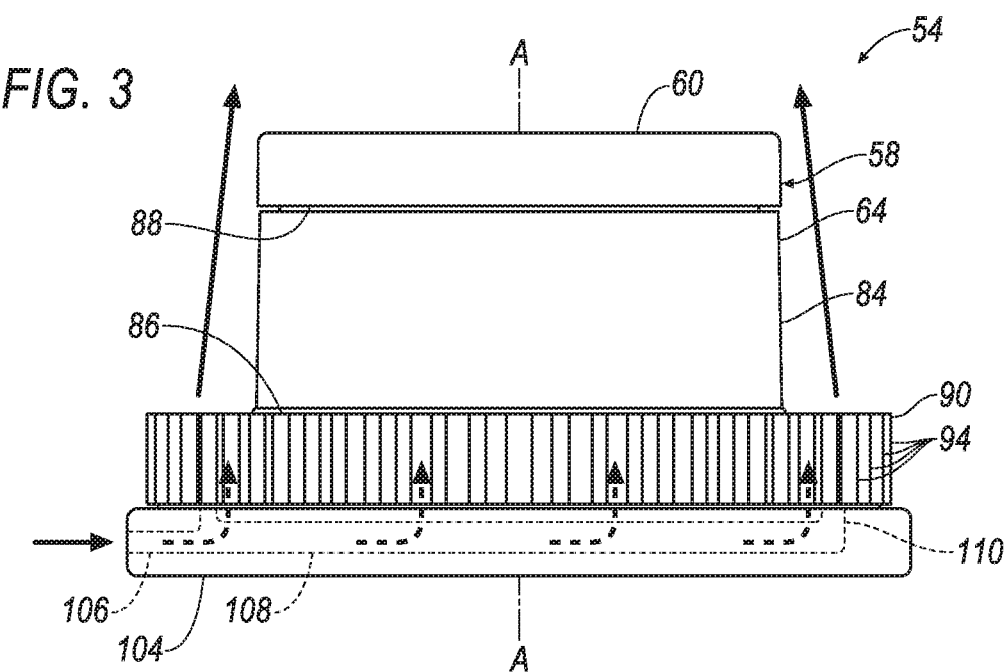
FIG. 3 is a side view of the sensor assembly.

With reference to FIGS. 1-3, the sensor assembly 54 is supported by the sensor arm 52. The sensor assembly 54 includes a housing 58. The housing 58 may have a cylindrical shape with a top cap 60, the base 56, and the sensor window 58. The top cap 60 is above, i.e., in a vehicle-upward direction from, the sensor window 58, and the base 56 is below, i.e., in a vehicle-downward direction from the sensor window 58. The housing 58 has a side surface 64 that includes an outside of the sensor window 58 and circumferentially extending sides of the top cap 60 and the base 56. The side-view mirrors 50 may be located below the housings 58, that is, in a vehicle-downward direction from the housings 58, and each base 56 has a bottom surface 62 that faces each side-view mirror. The cylindrical shape of the housing 58 defines the axis A, which runs through a center of the housing 58. The axis A is oriented vertically relative to the vehicle 30.

With reference to FIG. 2, the sensor 68 is disposed inside the housing 58 and is attached to and supported by the sensor arm 52. The sensor 68 may be designed to detect features of the outside world; for example, the sensor 68 may be a radar sensor, a scanning laser range finder, a light detection and ranging (LIDAR) device, or an image processing sensor such as a camera. In particular, the sensor 68 may be a LIDAR device. A LIDAR device detects distances to objects by emitting laser pulses at a particular wavelength and measuring the time of flight for the pulse to travel to the object and back.

The housing 58 may contain a rotating head 66, the sensor 68 including a laser 70 and a receiver 72, an encoder 74, a slip ring 76, a motor 78, an insulator 80, and a circuit board 82. The circuit board 82, the insulator 80, and the motor 78 may be fixed relative to the housing 58. The encoder 74, the slip ring 76, and the sensor 68 are fixed relative to each other and rotatably coupled to the motor 78. The motor 78 is configured to rotate the sensor 68 about a vertical axis A to provide horizontal 360° coverage. The insulator 80 may be positioned between the circuit board 82 and the motor 78 and may reduce the amount of heat traveling between the circuit board 82 and the motor 78.

With reference to FIGS. 2 and 3, the sensor window 84 is supported by and attached to the sensor arm 52, such as via the base 56. The sensor window 84 may be cylindrical and may also define the axis A. The sensor window 84 extends about the axis A. The sensor window 84 may extend fully about the axis A, that is, 360°, or partially about the axis A. The sensor window 84 extends along the axis A from a bottom edge 86 to a top edge 88. The sensor window 84 has a diameter. The diameter of the sensor window 84 may be the same as the rest of the side surface 64, if any; in other words, the sensor window 84 may be flush or substantially flush with the side surface 64. "Substantially flush" means a seam between the sensor window 84 and the rest of the side surface 64 does not cause turbulence in air flowing along the side surface 64. At least some of the sensor window 84 is transparent with respect to whatever medium the sensor 68 is capable of detecting. For example, if the sensor 68 is a LIDAR device, then the sensor window 84 is transparent with respect to visible light at the wavelength generated by the laser 70.

With reference to FIGS. 2-5, the heatsink 90 may be attached, e.g., fastened, adhered, etc., to the rest of the sensor assembly 54 and fixed relative to the sensor window 84. For example, the heatsink 90 may be fastened by one or more linkages 92 extending through the base 56. The heatsink 90 may be disposed below the sensor window 84 and annularly around the base 56. The heatsink 90 may be spaced from the base 56 or may touch the base 56. If the heatsink 90 is spaced from the base 56, the space between the heatsink 90 and the base 56 may be filled with a thermal gap filler such as thermal grease or silicon-coated gap filler. The heatsink 90 may be exposed to the ambient environment; i.e., no cover extends over the heatsink 90.

The heatsink 90 may be a material having a high thermal conductivity, e.g., aluminum or copper. Thermal conductivity is the property of a material to transmit heat. The heatsink 90 has a higher thermal conductivity than other components of the sensor assembly 54 such as the housing 58 and the sensor window 84.

With reference to FIG. 2, the heatsink 90 is directly connected to the circuit board 82 and/or the motor 78 by the linkages 92. The linkages 92 are thermal conductors. A thermal conductor, for the purposes of this disclosure, is defined as a component with a high thermal conductivity, substantially at least as high as the thermal conductivity of the heatsink 90.

With reference to FIGS. 2-5, the heatsink 90 is arranged annularly about the axis A. The heatsink 90 includes the plurality of fins 94. The fins 94 are oriented and elongated vertically, i.e., parallel to the axis A, and radially, i.e., away from the axis A. Each fin 94 may have, e.g., a rectangular shape. The fins 94 are exposed to the ambient environment. Each adjacent pair of fins 94 defines a gap 96 therebetween. The gaps 96 permit airflow between the fins 94 and allow heat to flow from the fins 94 to the ambient air. Multiple of the fins 94, e.g., the fins 94 on the vehicle-forward side of the heatsink 90, may be positioned to receive airflow therebetween from forward motion of the vehicle 30.

With reference to FIG. 1, an air system 98 includes a compressor 100, supply lines 102, and the duct 104. The compressor 100 and the duct 104 are fluidly connected to each other (i.e., fluid can flow from one to the other) via the supply lines 102.

The compressor 100 is fixed relative to the sensor window 84 and may be located in the vehicle 30 spaced from the sensor assembly 54. The compressor 100 increases the pressure of a gas by reducing a volume of the gas or by forcing additional gas into a constant volume. The compressor 100 may be any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The supply lines 102 extend from the compressor 100 to the duct 104. The supply lines 102 may be, e.g., flexible tubes.

With reference to FIGS. 2-5, the duct 104 is positioned to receive airflow from the compressor 100; e.g., the duct 104 may include an inlet 106 to which the supply line 102 is attached. The duct 104 may define an annular cavity 108 positioned below the heatsink 90. The diameter of the duct 104 may be larger than the diameter of the sensor window 84.

The duct 104 is positioned to direct airflow between the fins 94 and across the sensor window 84; in other words, a single pathline of the generated airflow from the duct 104 extends both between the fins 94 and from one side of the sensor window 84 to the other, e.g., from the bottom edge 86 to the top edge 88. "Across" means from one side of something to the other side. A "pathline" is defined as a trajectory of an individual fluid particle through a velocity vector field of a fluid. The airflow may form an air curtain across the sensor window 84; that is, the duct 104 is positioned to create an air curtain across the sensor window 84. An "air curtain" is a layer of moving air.

Figure 4:
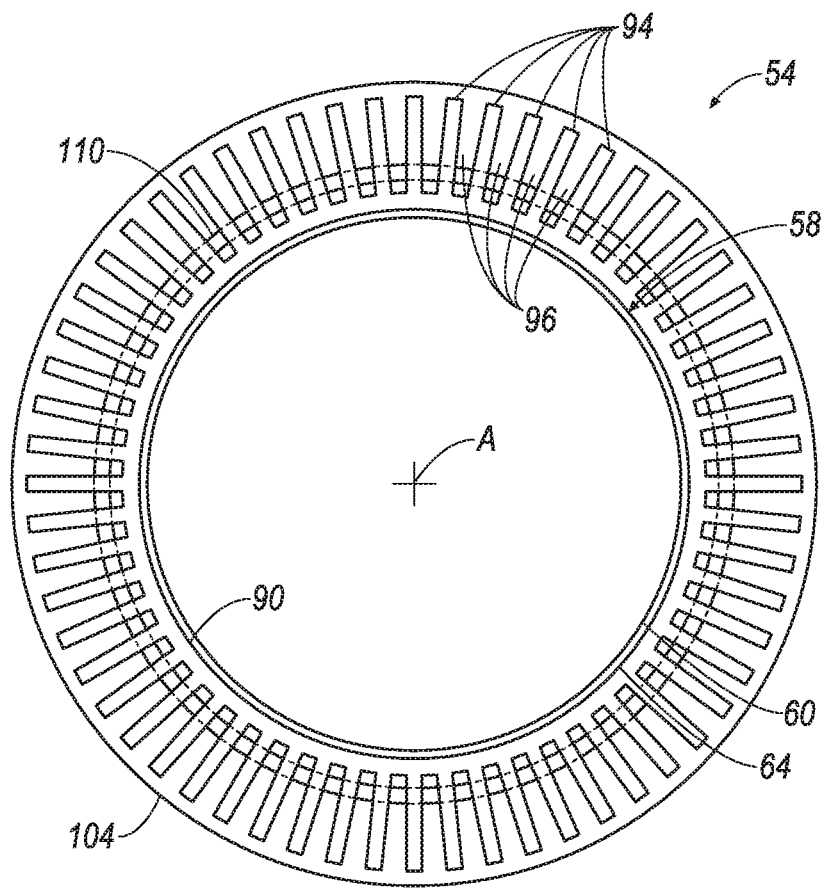
FIG. 4 is a top view of the sensor assembly with an example duct.
Figure 5:
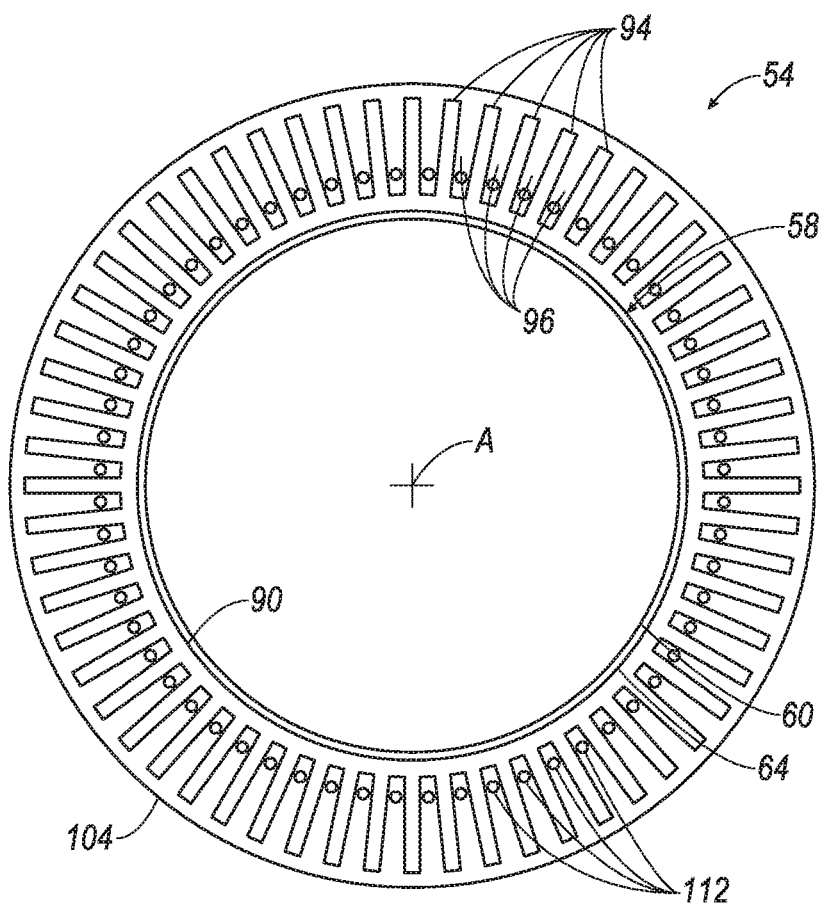
FIG. 5 is a top view of the sensor assembly with another example duct.

With reference to FIGS. 4 and 5, the duct 104 may include one or more openings 110, 112 directed upward from the cavity 108. For example, the duct 104 may include a slot 110 extending below multiple of the fins 94 or all the fins 94, as shown in FIG. 4. Air flowing from the slot 110 travels upward, is separated by the fins 94 into the gaps 96, and continues from the fins 94 across the sensor window 84. For another example, the duct 104 may include a plurality of nozzles 112, as shown in FIG. 5. Each nozzle 112 may be positioned to direct airflow through one of the gaps 96; e.g., each nozzle 112 may be positioned below one of the gaps 96. Air flowing from the nozzles 112 travels upward between the fins 94 and then across the sensor window 84.

In operation, the motor 78 rotates the sensor 68 about the axis A while the laser 70 emits light pulses and the receiver 72 receives the reflected light bursts. The circuit board 82 processes signals from the sensor 68. The sensor assembly 54, particularly the motor 78 and the circuit board 82, generate heat during operation. Some of the heat conducts through the linkages 92 to the heatsink 90. The compressor 100 blows air through the supply line 102 to the duct 104 and through the openings 110, 112. The airflow travels across the heatsink 90, absorbing heat from the surface of the fins 94, and then across the sensor window 84. The airflow across the sensor window 84 may reduce debris hitting the sensor window 84.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor assembly comprising:
   a sensor window;
   a heatsink including a plurality of fins, the heatsink fixed relative to the sensor window;
   a duct positioned to direct airflow between the fins and across the sensor window;
   a motor fixed relative to the sensor window, wherein the heatsink is directly connected by a thermal conductor to the motor; and
   a sensor rotatably coupled to the motor.

2. The sensor assembly of claim 1, further comprising a circuit board fixed relative to the sensor window, wherein the heatsink is directly connected by the thermal conductor to the circuit board.

3. The sensor assembly of claim 1, wherein the sensor is a LIDAR sensor.

4. The sensor assembly of claim 1, wherein the heatsink is disposed below the sensor window.

5. The sensor assembly of claim 1, wherein the fins are oriented vertically.

6. The sensor assembly of claim 1, wherein the duct includes a plurality of nozzles.

7. The sensor assembly of claim 6, wherein each adjacent pair of fins defines a gap therebetween, and each nozzle is positioned to direct airflow through one of the gaps.

8. The sensor assembly of claim 1, wherein the sensor window has a cylindrical shape.

9. The sensor assembly of claim 8, wherein the sensor window defines an axis, and the fins are elongated radially relative to the axis.

10. The sensor assembly of claim 8, wherein the sensor window defines an axis, and the heatsink is arranged annularly about the axis.

11. The sensor assembly of claim 1, further comprising a compressor fixed relative to the sensor window, wherein the duct is positioned to receive airflow from the compressor.

12. The sensor assembly of claim 1, wherein the duct is positioned to create an air curtain across the sensor window.

13. The sensor assembly of claim 1, wherein the duct includes a slot extending below multiple of the fins.

14. The sensor assembly of claim 1, wherein the fins are exposed to an ambient environment.

15. The sensor assembly of claim 1, wherein the sensor window is connectable to a vehicle, and multiple of the fins are positioned to receive airflow therebetween from forward motion of the vehicle.

16. The sensor assembly of claim 1, wherein the heatsink has a higher thermal conductivity than the sensor window.

17. A sensor assembly comprising:
    a sensor window;
    a heatsink including a plurality of fins, the heatsink fixed relative to the sensor window;
    a duct positioned to direct airflow between the fins and across the sensor window;
    wherein the sensor window has a cylindrical shape;
    the sensor window defines an axis; and
    the fins are elongated radially relative to the axis.

18. A sensor assembly comprising:
    a sensor window;
    a heatsink including a plurality of fins, the heatsink fixed relative to the sensor window;
    a duct positioned to direct airflow between the fins and across the sensor window;
    wherein the sensor window has a cylindrical shape;
    the sensor window defines an axis; and
    the heatsink is arranged annularly about the axis.

* * * * *